(12) United States Patent
Kingetsu

(10) Patent No.: US 11,644,211 B2
(45) Date of Patent: May 9, 2023

(54) AIR CONDITIONER CONTROL BASED ON PREDICTION FROM CLASSIFICATION MODEL

(71) Applicant: FUJITSU LIMITED, Kawasaki (JP)

(72) Inventor: Hiroaki Kingetsu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 553 days.

(21) Appl. No.: 16/821,506

(22) Filed: Mar. 17, 2020

(65) Prior Publication Data

US 2020/0300495 A1   Sep. 24, 2020

(30) Foreign Application Priority Data

Mar. 20, 2019   (JP) .............................. JP2019-053095

(51) Int. Cl.
| | | |
|---|---|---|
| F24F 11/64 | (2018.01) | |
| G06N 5/04 | (2023.01) | |
| G06N 20/00 | (2019.01) | |
| F24F 11/58 | (2018.01) | |
| G05B 13/02 | (2006.01) | |
| F24F 110/12 | (2018.01) | |
| F24F 110/10 | (2018.01) | |

(52) U.S. Cl.
CPC .............. *F24F 11/64* (2018.01); *F24F 11/58* (2018.01); *G05B 13/028* (2013.01); *G06N 5/04* (2013.01); *G06N 20/00* (2019.01); *F24F 2110/10* (2018.01); *F24F 2110/12* (2018.01)

(58) Field of Classification Search
None
See application file for complete search history.

(56) References Cited

U.S. PATENT DOCUMENTS

| | | | | |
|---|---|---|---|---|
| 8,001,062 | B1* | 8/2011 | Gargi | G06K 9/00516 706/12 |
| 2014/0074300 | A1* | 3/2014 | Shilts | G06Q 50/06 700/276 |
| 2016/0314506 | A1* | 10/2016 | Kang | G06N 20/10 |
| 2016/0364963 | A1* | 12/2016 | Matsuoka | G06K 9/6267 |
| 2018/0053108 | A1 | 2/2018 | Olabiyi et al. | |
| 2018/0336888 | A1* | 11/2018 | Jiang | G06N 3/08 |
| 2018/0373234 | A1* | 12/2018 | Khalate | G06N 7/005 |

(Continued)

FOREIGN PATENT DOCUMENTS

| | | |
|---|---|---|
| JP | 2015-018389 A | 1/2015 |
| JP | 2018-028906 A | 2/2018 |

*Primary Examiner* — Bernard G Lindsay
(74) *Attorney, Agent, or Firm* — Fujitsu Patent Center

(57) ABSTRACT

A prediction method implemented by a computer, the method includes: receiving a classification model from a server, the classification model being a model for classifying logs of an electronic device into two or more classes, the server being a computer configured to distribute the classification model; calculating, with respect to different time points, a prediction error by using a predicted value outputted by the classification model and an actual measured value observed at each of the different time points; performing sequential machine learning for the classification model to have the prediction error satisfy a certain condition; and when a cumulative sum with respect to the prediction error of the sequential machine learning is equal to or greater than a threshold, requesting the server apparatus to relearn the classification model.

5 Claims, 12 Drawing Sheets

(56) References Cited

U.S. PATENT DOCUMENTS

| | | | |
|---|---|---|---|
| 2020/0200415 A1* | 6/2020 | Gray | G05B 17/02 |
| 2020/0285891 A1* | 9/2020 | Yellin | G06N 20/00 |
| 2022/0012547 A1* | 1/2022 | Zhu | H04M 1/72415 |

* cited by examiner

FIG. 4

| AIR CONDITIONER | DATE AND TIME | ROOM TEMPERATURE | OUTSIDE-AIR TEMPERATURE | ... |
|---|---|---|---|---|
| AIR CONDITIONER 1 | 11/1/2019 0:00 | 20 | 10 | ... |
| | 11/1/2019 1:00 | 19 | 10 | ... |
| | ... | ... | ... | ... |
| AIR CONDITIONER2 | 11/1/2019 0:00 | 25 | 20 | ... |
| | ... | ... | ... | ... |
| ... | ... | ... | ... | ... |

FIG. 5

| AIR CONDITIONER | TIME | ON/OFF |
|---|---|---|
| AIR CONDITIONER 1 | 11/1/2019 0:00 | OFF |
| | 11/1/2019 1:00 | OFF |
| | ... | ... |
| AIR CONDITIONER 2 | 11/1/2019 0:00 | ON |
| | ... | ... |
| ... | ... | ... |

FIG. 6

| AIR CONDITIONER | TIME | USER OPERATION (LABEL) | FEATURE 1 (FIVE MINUTES BEFORE) | FEATURE 2 (TEN MINUTES BEFORE) | FEATURE 3 (FIFTEEN MINUTES BEFORE) |
|---|---|---|---|---|---|
| AIR CONDITIONER 1 | t1 | Up | TEMPERATURE, HUMIDITY, AND OUTSIDE-AIR TEMPERATURE | TEMPERATURE, HUMIDITY, AND OUTSIDE-AIR TEMPERATURE | TEMPERATURE, HUMIDITY, AND OUTSIDE-AIR TEMPERATURE |
| | t2 | Keep | TEMPERATURE, HUMIDITY, AND OUTSIDE-AIR TEMPERATURE | TEMPERATURE, HUMIDITY, AND OUTSIDE-AIR TEMPERATURE | TEMPERATURE, HUMIDITY, AND OUTSIDE-AIR TEMPERATURE |
| | ... | ... | ... | ... | ... |
| AIR CONDITIONER 2 | t1 | ... | ... | ... | ... |
| | ... | ... | ... | ... | ... |

FIG. 9

| TIME | t1 | t2 | t3 | t4 | t5 |
|---|---|---|---|---|---|
| OPERATIONAL ACTIVITY ACCORDING TO ACTUAL USER OPERATION | NO OPERATION | NO OPERATION | NO OPERATION | DECREASE TEMPERATURE | NO OPERATION |
| PREDICTION BY LEARNING MODEL | NO OPERATION | INCREASE TEMPERATURE | NO OPERATION | NO OPERATION | NO OPERATION |

AIR CONDITIONER CONTROL BASED ON PREDICTION FROM CLASSIFICATION MODEL

CROSS-REFERENCE TO RELATED APPLICATION

This application is based upon and claims the benefit of priority of the prior Japanese Patent Application No. 2019-53095, filed on Mar. 20, 2019, the entire contents of which are incorporated herein by reference.

FIELD

The embodiments discussed herein are related to a prediction method, a model learning method, and a non-transitory computer-readable storage medium storing a prediction program.

BACKGROUND

A technology is used for making the room temperature comfortable for users. In the technology, a learning model for predicting changes in room temperature and air conditioning control such as controlling room temperature is learned by using, as learning data, log information about logs of changes in room temperature and operations of an air conditioner. In recent years, a technology in which a cloud server, and an air conditioner and a remote control device in a target space (an edge) all cooperate with each other has become known. For example, a cloud server collects log information relating to users of different target spaces, learns a learning model for predicting an air conditioning control, and distributes the learning model to edges. The remote control devices or the like at the edges input log information to the learning model and each performs an air conditioning control in accordance with the result outputted by the learning model.

Examples of the related art include Japanese Laid-open Patent Publication Nos. 2018-28906 and 2015-18389.

SUMMARY

According to an aspect of the embodiments, a prediction method implemented by a computer, the method includes: receiving a classification model from a server, the classification model being a model for classifying logs of an electronic device into two or more classes, the server being a computer configured to distribute the classification model; calculating, with respect to different time points, a prediction error by using a predicted value outputted by the classification model and an actual measured value observed at each of the different time points; performing sequential machine learning for the classification model to have the prediction error satisfy a certain condition; and when a cumulative sum with respect to the prediction error of the sequential machine learning is equal to or greater than a threshold, requesting the server apparatus to relearn the classification model.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates an example of information stored in a sensor value database (DB);

FIG. 5 illustrates an example of information stored in an operation log DB;

FIG. 6 illustrates learning data in an air conditioning control server;

FIG. 9 illustrates a manner of handling prediction errors;

DESCRIPTION OF EMBODIMENT(S)

However, in the technology described above, since prediction is performed by the edge, it is on the one hand possible to achieve high speed prediction; but on the other hand, since the learning model is updated by the cloud server, it is difficult to follow sudden temperature changes in real time, and as a result, the prediction accuracy may be deteriorated.

For example, the cloud server updates the learning model at preset intervals such as weekly intervals and distributes the updated learning model to the edges, and as a result, when the temperature suddenly changes at the time of cold wave or the end of rainy season, an accurate learning model is distributed to the edges as late as one week elapses since. Thus, when updating the learning model is required, a time lag occurs before the updating the learning model and distribution of the learning model, resulting in the inadequate responsiveness.

In one aspect, an object is to provide a prediction method, a prediction program, and a model learning method that may hinder the deterioration of prediction accuracy.

According to one embodiment, it is possible to hinder the deterioration of prediction accuracy.

Hereinafter, embodiments of a prediction method, a prediction program, and a model learning method disclosed in the present application are described in detail with reference to the drawings. It is noted that the embodiments do not limit the present disclosure. The embodiments may be combined with each other as appropriate when there is no contradiction.

First Embodiment

[Example of Overall Configuration]

Figure 1:
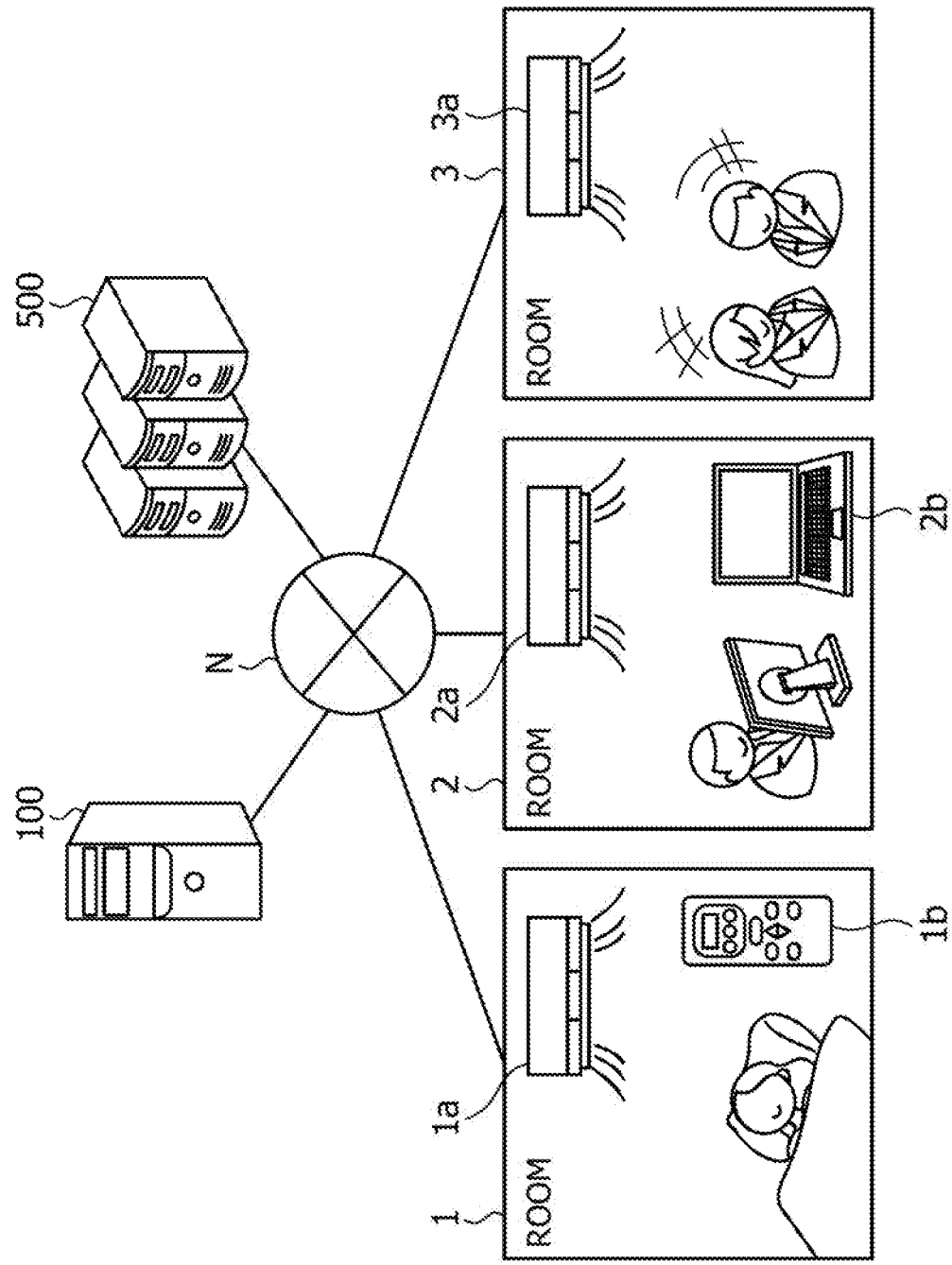
FIG. 1 illustrates an example of an overall configuration of a system according to a first embodiment.

FIG. 1 illustrates an example of an overall configuration of a system according to a first embodiment. As illustrated in FIG. 1, the system is an air conditioning control system developed by establishing cooperation between a cloud server and edge terminals, in which an air conditioning control server 100 that provides a cloud service for users, devices that are installed individually in rooms 1 to 3 serving as an example of spaces targeted for air conditioning control, and an external server group 500 are coupled to each other via a network N to communicate with each other. Various wired and wireless communication networks, such as the Internet, may be used as the network N.

The rooms are an example of edges targeted for control by a cloud server. For example, an air conditioning device 1a that is installed in the room and performs air conditioning control in the room and a remote control device 1b that sends an instruction for air conditioning control to the air conditioning device 1a are situated in the room 1. An air conditioning device 2a that is installed in the room and performs air conditioning control in the room and an information terminal 2b that sends an instruction for air conditioning control to the air conditioning device 2a by using, for example, a wireless network and Universal Plug and Play (UPnP) are situated in the room 2. An air conditioning device 3a that is installed in the room and that receives details of instruction provided by the air conditioning control server 100 and performs air conditioning control by following the details of instruction is situated in the room 3.

In the description here, the device that communicates with the air conditioning control server 100 and controls an air conditioning device in each room is referred to as an edge terminal 10. For example, the remote control device 1b is the edge terminal 10 in the case of the room 1; the information terminal 2b is the edge terminal 10 in the case of the room 2; and the air conditioning device 3a is the edge terminal 10 in the case of the room 3.

While not illustrated in the drawing, a sensor that measures outside-air temperature, a sensor that measures temperature and humidity in the room, and the like are installed in each room. Sensor values (observed values) obtained by the various sensors by sensing are transmitted by the sensors and the like to the air conditioning control server 100. The air conditioning devices and the edge terminals each collect an operation log in which an on/off status of air conditioning control and the time are associated with each other and send the operation log to the air conditioning control server 100. While in this description the case of three rooms is explained, the case is a mere example and not intended to limit the number of rooms.

The external server group 500 includes, for example, a weather server that retains temperature information about different areas. For example, the weather server has daily temperature and temperature changes of an area around each room and provides the daily temperature and temperature changes for the air conditioning control server 100.

The air conditioning control server 100 is a cloud server that provides a cloud service for users of the rooms. The air conditioning control server 100 receives sensor values, operation logs, and the like from the rooms and learns a learning model by using as learning data the sensor values, operation logs, and the like. For example, the air conditioning control server 100 learns a learning model (a classification model) for classification by using, as explanatory variables, temperature information of room temperature, outside-air temperature, and the like and user operations indicating increasing the temperature (Up), decreasing the temperature (Down), maintaining the temperature (Keep), or the like. The air conditioning control server 100 distributes to the edge terminals 10 the leaning model having been subjected to learning.

Each of the edge terminals 10 in the rooms predicts, by using the leaning mode distributed by the air conditioning control server 100, a user operation in accordance with information of the current temperature in the corresponding room and performs air conditioning control based on the prediction result. In this manner, air conditioning control performed by the edge is implemented.

Incidentally, in usual simple edge-cloud cooperation, after the learning model is distributed to the edges, the learning model is used for prediction without being updated, and as a result, when a weather change such as a sudden cold wave that is different from the normal states used at the time of learning occurs, the prediction accuracy is deteriorated. In this case, it is usually considered that, to respond to such sudden weather change, the learning model is updated every time on the cloud server (the air conditioning control server 100) and distributed to the edge terminals 10.

However, this method requires frequent communications and relatively long time for communication, and thus, it is difficult to update the learning model in real time, resulting in low responsiveness. This means that, in the simple edge-cloud cooperation, learning based on a multitude of data is impossible at edges in which computational resources are limited, and thus, when the prediction is trapped into a local optimum, the problem is not solved immediately and prediction errors increase.

In this regard, in the air conditioning control system according to the first embodiment, the edge terminals 10 each perform air conditioning control by using prediction in accordance with the learning model distributed by the air conditioning control server 100 and locally updates the learning model by using the prediction result. When the prediction accuracy is equal to or greater than a threshold, the edge terminals 10 each request the air conditioning control server 100 to relearn the learning model.

Figure 2:
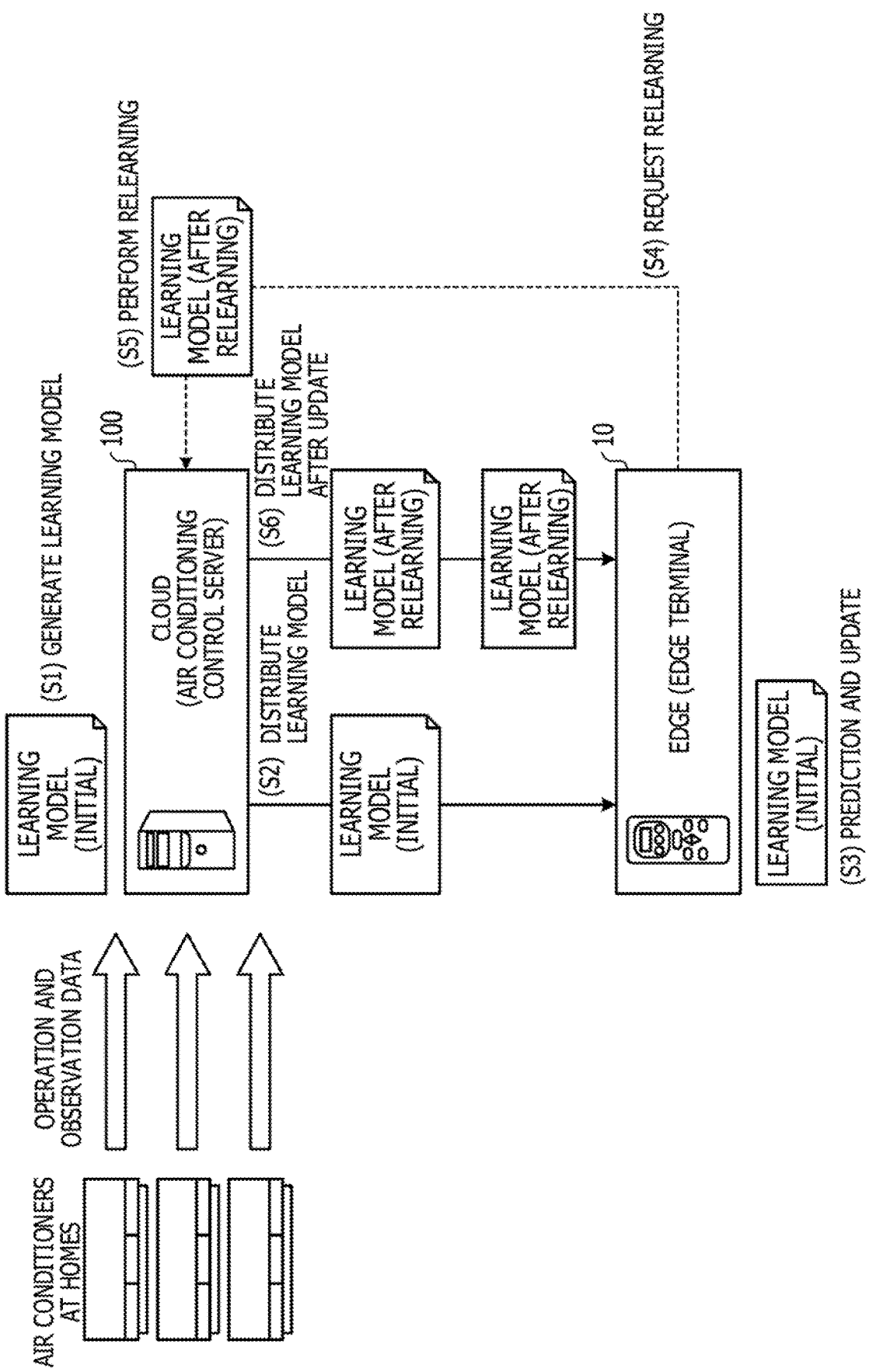
FIG. 2 illustrates distribution and update of a learning model according to the first embodiment.

FIG. 2 illustrates the distribution and update of a learning model according to the first embodiment. As illustrated in FIG. 2, the air conditioning control server 100 obtains observed values such as operation logs of the air conditioning devices and sensor values of the sensors from, for example, rooms at home and learns a learning model by using the observed values as learning data (S1). The air conditioning control server 100 distributes to edges the learning model having been subjected to learning (S2).

Afterward, the edge terminals 10 as edges each predict a user operation by using the distributed learning model and performs air conditioning control based on the predicted value; the edge terminals 10 also locally update the learning model by using information about whether the predicted value is accurate (S3). The edge terminal 10 only locally updates the learning model when the cumulative value of prediction errors is less than a threshold; but when the cumulative value of prediction errors is equal to or greater than the threshold, the edge terminal 10 requests the air conditioning control server 100 to relearn the learning model (S4).

The air conditioning control server 100 relearns the learning model by using as learning data the observed values that have been collected and accumulated after the learning model was distributed (S5). The air conditioning control server 100 distributes the learning model after relearning to the edges (S6). Subsequently, the edge terminal 10 performs the same processing operations as those in S3 and the following step.

In this manner, the edge is able to perform both prediction and learning until the prediction errors increase to a limit, and thus, it is possible to reduce the frequency of communications between the edge terminal 10 and the air conditioning control server 100 and develop a learning system with high responsiveness. As a result, it is possible to hinder the deterioration of prediction accuracy.

[Functional Configuration]

Figure 3:
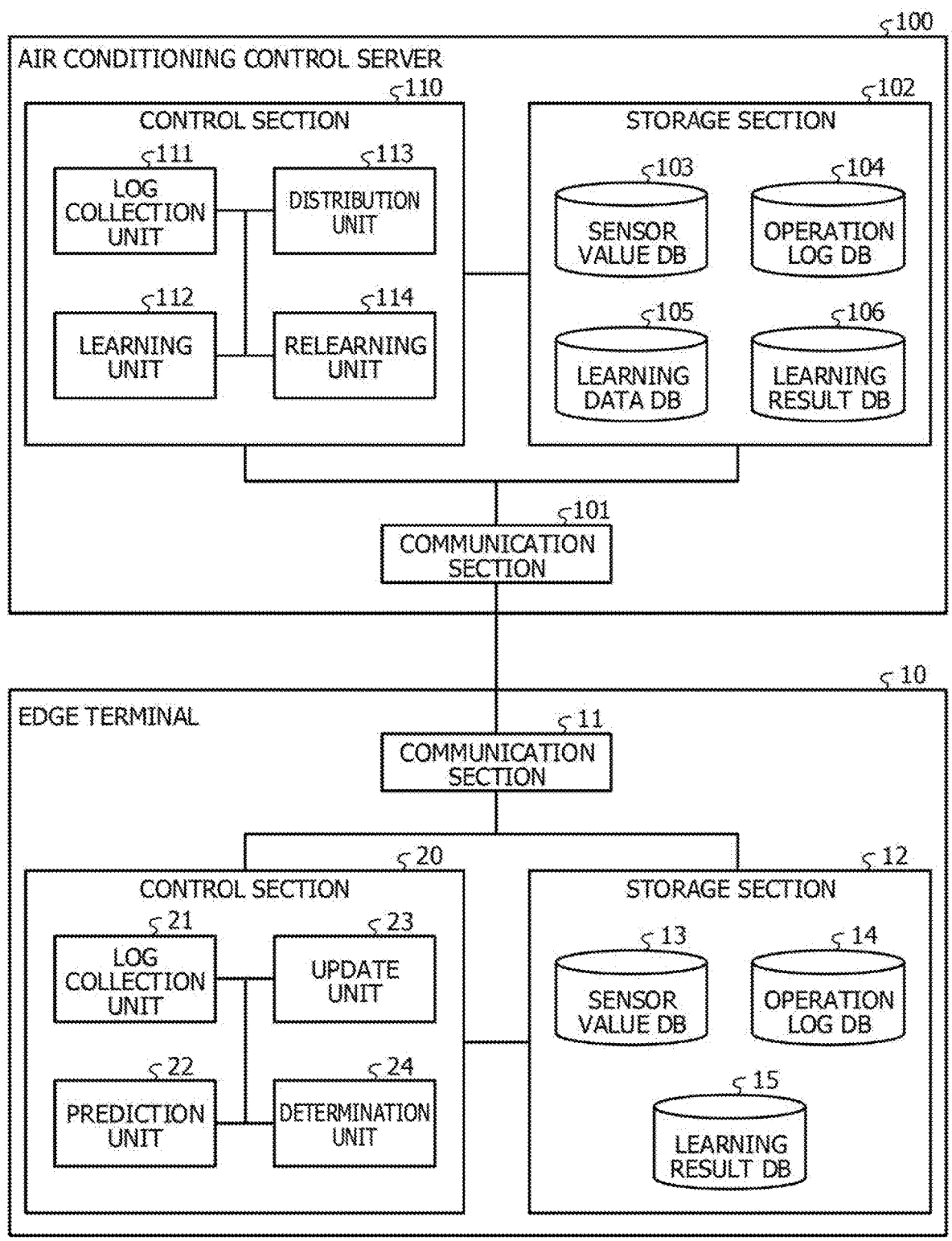
FIG. 3 is a functional block diagram illustrating a functional configuration of a system according to the first embodiment.

Next, a functional configuration of the devices illustrated in FIG. 1 is described. FIG. 3 is a functional block diagram illustrating a functional configuration of the system according to the first embodiment. The weather server included in the external server group 500, and the sensors and the air conditioning device in each room have general functionalities and detailed description thereof is thus omitted. Here, the air conditioning control server 100 and the edge terminal 10 are described.

(Functional Configuration of Air Conditioning Control Server 100)

As illustrated in FIG. 3, the air conditioning control server 100 includes a communication section 101, a storage section 102, and a control section 110. The communication section 101 is a processing unit that controls communication with other devices and is, for example, a communication interface. For example, the communication section 101 receives various kinds of data such as an operational result, air conditioning control information, and an operation log from devices installed in each room such as the air conditioning device, the edge terminal 10, and the sensors and sends a command and information for air conditioning control to the edge terminal 10.

The storage section 102 is an example of a storage device that stores data and a program to be run by the control section 110 and is, for example, a memory or a hard disk. The storage section 102 stores a sensor value database (DB) 103, an operation log DB 104, a learning data DB 105, and a learning result DB 106.

The sensor value DB 103 is a database that stores sensor values obtained by the sensors in each room with regard to, for example, outside-air temperature and room temperature. For example, sensor values stored here are observed values obtained by the air conditioning control server 100 from the sensors and may include another kind of observed value regarding, for example, changes in temperature over time that is measure by a sensor. The sensor value DB 103 stores sensor values with respect to each user, that is, sensors in each room (space).

FIG. 4 illustrates an example of information stored in the sensor value DB 103. As illustrated in FIG. 4, the sensor value DB 103 stores, for example, "air conditioner, date and time, room temperature, outside-air temperature" in an associated manner. "Air conditioner" stored here indicates an identifier identifying a particular air conditioning device and "date and time" indicates a date and time when corresponding data is obtained by measurement. "Room temperature" indicates a temperature measured in a corresponding room by a sensor of the room and "outside-air temperature" indicates a temperature measured outside a corresponding room by a sensor of the room. The example in FIG. 4 indicates hourly sensor values; and concerning an air conditioner 1, the example indicates that "the room temperature was 20 degrees and the outside-air temperature was 10 degrees at 0:00 on Nov. 1, 2019".

The operation log DB 104 is a database that stores log information about operations of the air conditioning device in each room. The log information stored here is information that is obtained by the air conditioning control server 100 from the air conditioning devices and the remote control devices of the air conditioning devices and may include another kind of information such as a set temperature that is measured by, for example, the air conditioning device. The operation log DB 104 stores operation logs with respect to each user, that is, an air conditioning device in each space.

FIG. 5 illustrates an example of information stored in the operation log DB 104. As illustrated in FIG. 5, the operation log DB 104 stores "air conditioner, date and time, ON/OFF" in an associated manner. "Air conditioner" stored here indicates an identifier identifying a particular air conditioning device and "date and time" indicates a date and time when measurement is performed. "ON/OFF" indicates an operation log of a corresponding air conditioning device. The example in FIG. 5 indicates that the air conditioner 1 was in an OFF state at 0:00 on Nov. 1, 2019.

The learning data DB 105 is a database that stores learning data used for learning a learning model, that is, training data. FIG. 6 illustrates learning data in the air conditioning control server 100. As illustrated in FIG. 6, the learning data DB 105 stores "air conditioner, time, user operation (label), feature 1 (five minutes before), feature 2 (ten minutes before), feature 3 (fifteen minutes before)" in an associated manner.

"Air conditioner" stored here indicates an identifier identifying a particular air conditioning device. "Time" indicates a time at which a corresponding user operation is performed. "User operation" indicates the details of an operation performed by a user as air conditioning control; for example, "Up" for increasing the set temperature, "Down" for decreasing the set temperature, or "Keep" for maintaining the set temperature (not operation) is set as "user operation". For example, "feature 1 (five minutes before)" Indicates sensor values or the like obtained five minutes before the time at which a corresponding user operation is performed, "feature 2 (ten minutes before)" indicates sensor values or the like obtained ten minutes before the time at which a corresponding user operation is performed, and "feature 3 (fifteen minutes before)" indicates sensor values or the like obtained fifteen minutes before the time at which a corresponding user operation is performed.

Figure 7:
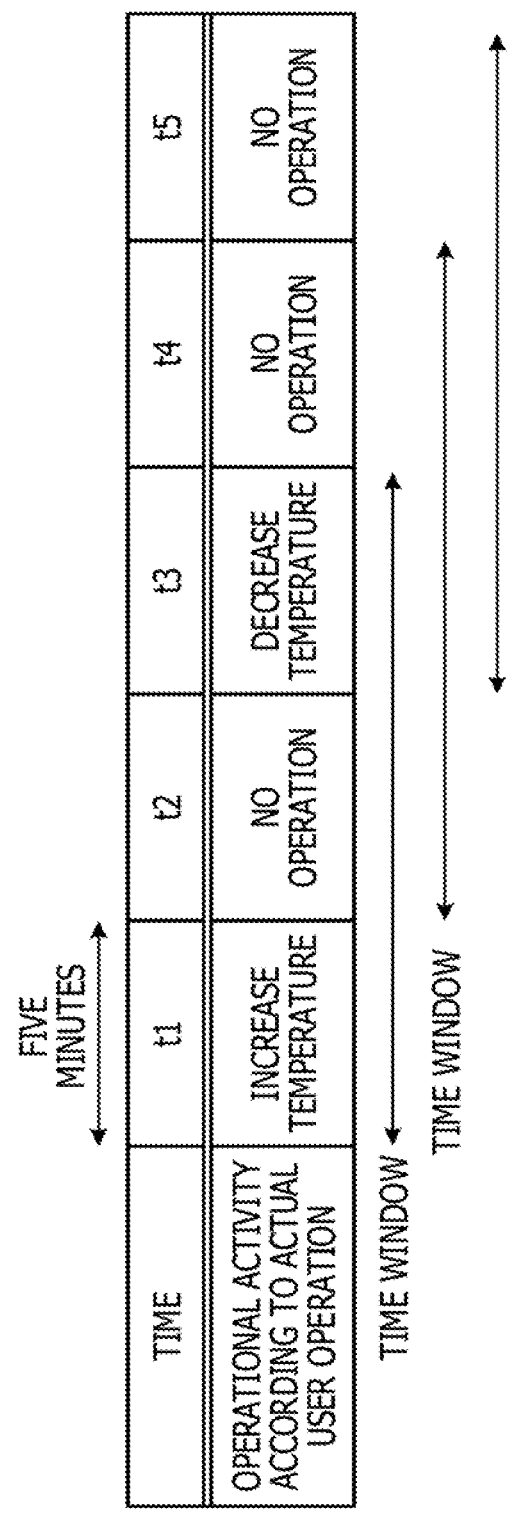
FIG. 7 illustrates an example of determination of user operation.

Specifically, "user operation" as a target variable, "feature 1, feature 2, and feature 3" as explanatory variables are used for learning. Here, an example of determination of user operation is described. FIG. 7 illustrates an example of determination of user operation. As illustrated in FIG. 7, sensor values or the like are obtained at, for example, five-minute intervals such as a time t1 and a time t2. When the number of time ranges used as learning data is 3, data of five minutes before, data of ten minutes before, data of fifteen minutes before are used as learning data. The details of a user operation at each time are obtained as information from the operation log. As the details of the user operation, details of an operational activity performed actually by a user at the time is set.

For example, when learning data corresponding to the time t1 is generated, a sensor value at a time t−1 that is five minutes before the time t1, a sensor value at a time t−2 that is ten minutes before the time t1, and a sensor value at a time t−3 that is fifteen minutes before the time t1 are set as explanatory variables in the generated learning data and "Up" indicating "increasing the set temperature" that is a user operation actually having occurred within thirty minutes after the time t1 is set as a target variable in the generated learning data.

The learning result DB 106 is a database that stores learning results. For example, the learning result DB 106 stores, for example, a determination result (a classification result) about learning data obtained by the control section 110 and various parameters for developing a learning model by employing, for example, neural networks and logistic regression.

Other than these DBs, it is possible to store various kinds of information. For example, a weather information DB that stores weather information obtained from an outside weather server or the like may be stored. For example, the weather information DB stores, for example, observed values regarding outside-air temperature and humidity, forecast values regarding outside-air temperature and humidity, and the weather that are obtained by the air conditioning control server 100 from the weather server at a given time.

The control section 110 is a processing unit that controls the entire air conditioning control server 100 and is, for example, a processor. The control section 110 includes a log collection unit 111, a learning unit 112, a distribution unit 113, and a relearning unit 114. The log collection unit 111, the learning unit 112, the distribution unit 113, and the relearning unit 114 are an example of electronic circuits included in the processor or an example of processes executed by the processor.

The log collection unit 111 is a processing unit that collects various observed values from the sensors and the like in the rooms. Specifically, the log collection unit 111 obtains sensor values from the sensors and stores the sensor values in the sensor value DB 103; the log collection unit 111 obtains operation logs from the air conditioning devices and stores the operation logs in the operation log DB 104; and the log collection unit 111 obtains weather information from the weather server and the like and stores the weather information in, for example, the storage section 102. This means that the log collection unit 111 collects in the cloud various kinds of data serving as targets of learning data.

The log collection unit 111 generates learning data from collected logs in accordance with the method described by using FIG. 7 and stores the learning data in the learning data DB 105. The log collection unit 111 periodically collects sensor values and the like from the edges after the learning model is distributed.

The learning unit 112 is a processing unit that learns a learning model. Specifically, the learning unit 112 learns, by using different kinds of learning data stored in the learning data DB 105, a learning model developed by employing, for example, neural networks and logistic regression. After learning is completed, the learning unit 112 stores, as learning results, various parameters for developing the learning model in the learning result DB 106.

Specifically, the learning unit 112 develops, in accordance with sensor values of five minutes before, ten minutes before, and fifteen minutes before, a learning model for predicting a user operation that would occur within thirty minutes. To develop the learning model, it is possible to employ, for example, neural networks and logistic regression. The time to end learning may be set at any time, such as the time at which learning by using items of learning data more than a predetermined number of items is completed or the time at which the reconstruction error reaches less than a threshold.

The distribution unit 113 is a processing unit that distributes the learning model having been subjected to learning to edges. For example, the distribution unit 113 distributes to the edge terminals 10 various parameters that are learning results stored in the learning result DB 106.

The relearning unit 114 is a processing unit that relearns the learning model having been subjected to learning. For example, when the relearning unit 114 receives a request for relearning from any of the edge terminals 10, the relearning unit 114 generates learning data from log information collected after the previous distribution and relearns the learning data. This means that the relearning unit 114 updates the distributed learning model in accordance with a large amount of learning data based on a large number of logs having been collected after the previous learning was completed. The learning data used for relearning is not limited to the learning data based on logs having been collected after the previous learning was completed, and both the learning data used in the previous learning and the learning data based on logs having been collected after the previous learning was completed may be used together.

After relearning is completed, the relearning unit 114 stores, as relearning results, various parameters for developing the learning model after relearning in the learning result DB 106. The relearning unit 114 also redistributes the relearning results to the edge terminal 10 that has requested relearning or the edge terminals 10 to which the previous learning model has distributed.

(Functional Configuration of Edge Terminal 10)

As Illustrated in FIG. 3, the edge terminal 10 includes a communication section 11, a storage section 12, and a control section 20. The communication section 11 is a processing unit that controls communication with other devices and is, for example, a communication interface. For example, the communication section 11 transmits and receives various kinds of data to and from the air conditioning control server 100 and other terminals in the same space such as the air conditioning device and the sensors.

The storage section 12 is an example of a storage device that stores data and a program to be run by the control section 20 and is, for example, a memory or a hard disk. The storage section 12 stores a sensor value DB 13, an operation log DB 14, and a learning result DB 15.

The sensor value DB 13 is a database that stores sensor values obtained by the sensors of a particular room as the same space with regard to outside-air temperature and room temperature. For example, the sensor values stored here are used as learning data and transmitted to the air conditioning control server 100. The stored information is the same as that in FIG. 4 and detailed description thereof is thus omitted. However, unlike FIG. 4, the sensor value DB 13 does not store information about other edges but only the information about a particular edge at which the edge terminal 10 per se is installed.

The operation log DB 14 is a database that stores log information about operations of the air conditioning device in the particular room as the same space. For example, the log information stored here is information obtained from the air conditioning device, the remote control device of the air conditioning device, and the like. The log information is used as learning data and transmitted to the air conditioning control server 100. However, unlike FIG. 5, the operation log DB 14 does not store information about other edges but only the information about a particular edge at which the edge terminal 10 per se is installed.

The learning result DB 15 is a database that stores various parameters used for developing a learning model. The learning result DB 15 stores, for example, learning results distributed by the air conditioning control server 100 and results of online learning obtained by the control section 20.

The control section 20 is a processing unit that controls the entire edge terminal 10 and is, for example, a processor. The control section 20 includes a log collection unit 21, a prediction unit 22, an update unit 23, and a determination unit 24. The log collection unit 21, the prediction unit 22, the update unit 23, and the determination unit 24 are an example of electronic circuits included in the processor or an example of processes executed by the processor. For example, the control section 20 receives learning results distributed by the air conditioning control server 100 and stores the learning results in the learning result DB 15.

Figure 8:
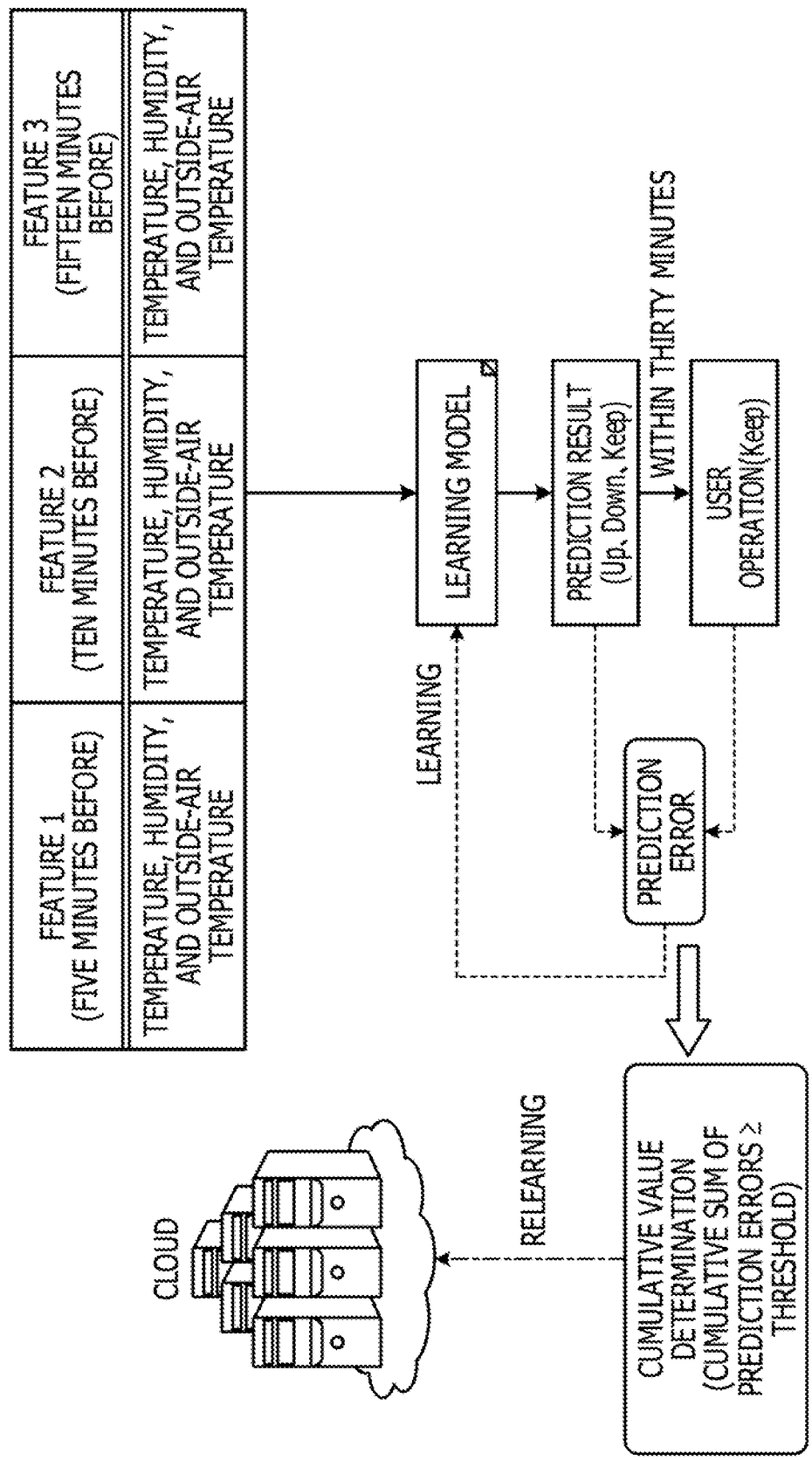
FIG. 8 illustrates prediction and learning performed by an edge.

The edge terminal 10 performs prediction in accordance with the distributed learning model and online learning of the learning model; when prediction errors have increased to the limit, the edge terminal 10 requests the air conditioning control server 100 to perform relearning. FIG. 8 illustrates prediction and learning performed by an edge. As illustrated in FIG. 8, when the feature 1, such as temperature and the like, at a time that is five minutes before a given time, the feature 2 at a time that is ten minutes before the given time, and the feature 3 at a time that is fifteen minutes before the given time are collected, the edge terminal 10 inputs the features 1 to 3 as prediction data to the distributed learning model and accordingly obtains a prediction result (an output result).

The edge terminal 10 then performs air conditioning control in accordance with the prediction result indicating, Up, Down, or Keep. Afterward, the edge terminal 10 obtains a user operation (for example, Keep) within thirty minutes after the prediction as a user operation corresponding to the prediction result. The edge terminal 10 calculates a prediction error between the prediction result and the actual user operation and updates the learning model by using the prediction error.

The edge terminal 10 calculates the cumulative value of prediction errors up to the latest user operation and accordingly performs cumulative value determination. Specifically, when the cumulative value of prediction errors is less than a threshold, the edge terminal 10 continues to use the distributed learning model. By contrast, when the cumulative value of prediction errors is equal to or greater than the threshold, the edge terminal 10 requests the air conditioning control server 100 to relearn the learning model.

As described above, when the prediction errors are within an acceptable range, the edge terminal 10 continues to use the distributed learning model while updating little by little the distributed learning model. When the prediction errors are unacceptable due to, for example, the occurrence of sudden cold waves, the edge terminal 10 requests the air conditioning control server 100 to perform relearning.

Moving back to FIG. 3, the log collection unit 21 is a processing unit that collects various kinds of data from the sensors and the like in the room. Specifically, the log collection unit 21 obtains sensor values from the sensors and stores the sensor values in the sensor value DB 13; the log collection unit 21 also obtains operation logs from the air conditioning device and stores the operation logs in the operation log DB 14. The log collection unit 21 periodically sends the collected various kinds of data to the air conditioning control server 100.

The prediction unit 22 is a processing unit that predicts a user operation by using the learning model having been subjected to learning. For example, the prediction unit 22 reads from the learning result DB 15 the learning results distributed by the air conditioning control server 100 and accordingly develops the learning model after learning. The prediction unit 22 inputs information of the collected sensor values and the like as prediction data to the learning model and accordingly obtains a prediction result (an output result). The prediction unit 22 then performs air conditioning control in accordance with the prediction result and outputs the prediction result to the update unit 23 and the determination unit 24.

For example, when, at the time T, sensor values for fifteen minutes before a time T have been collected, the prediction unit 22 generates prediction data. Specifically, the prediction unit 22 generates the feature 1 at a time that is five minutes before the time T, the feature 2 at a time that is ten minutes before the time T, and the feature 3 at a time that is fifteen minutes before the time T, which each include temperature, humidity, outside-air temperature, and the like. The prediction unit 22 inputs these features 1 to 3 as prediction data to the distributed learning model and accordingly obtains a prediction result.

The prediction unit 22 obtains, as a prediction result, a classification result indicating a probability in which a user operation for Up occurs within thirty minutes, a probability in which a user operation for Keep occurs within thirty minutes, and a probability in which a user operation for Down occurs within thirty minutes.

When the probability for Up is the highest, the prediction unit 22 predicts that the set temperature of the air conditioning device would have been increased after five minutes and increases the present set temperature by a predetermined value (for example, 1 degree) so that the temperature remains comfortable for the user after five minutes.

When the probability for Keep is the highest, the prediction unit 22 determines that the set temperature of the air conditioning device would not have been changed by the user after five minutes and maintains the present set value. When the probability for Down is the highest, the prediction unit 22 predicts that the set temperature of the air conditioning device would have been decreased after five minutes and decreases the present set temperature by a predetermined value (for example, 1 degree) so that the temperature remains comfortable for the user five minutes later.

The update unit 23 is a processing unit that locally updates the learning model by using the prediction result obtained by the prediction unit 22 and the actual user operation. Specifically, the update unit 23 locally updates the learning model to decrease the prediction error or make the prediction error reach zero. The update unit 23 performs online learning (may be referred to as "sequential learning", "sequential machine learning", "machine learning", and the like) by employing an online gradient descent method and adjusts the developed learning model in a fine manner by using the observed data.

For example, when the prediction result indicates "Up", the update unit 23 obtains from the air conditioning device or the like information about the user operation having occurred within thirty minutes after the time at which the prediction was performed. When the user operation having occurred within thirty minutes is "Keep", the update unit 23 updates a corresponding weight in the learning model by employing an online gradient descent method expressed by expression (1) and stores the update result in the learning result DB 15. In the following prediction, the learning model after update is utilized.

$$w_i \leftarrow w_i - \rho \frac{\partial E}{\partial w_i} \quad (1)$$

In expression (1), w is a weight, E is an error, and ρ is a learning rate. As the error in expression (1), it is possible to use a cross entropy error expressed by expression (2). For example, when the ith time window includes N items of data, the cross entropy error is $E_i$ that is calculated in accordance with expression (2). Here, $t_{nk}$ indicates an operation log of an air conditioning device corresponding to kth dimension of nth item of data and $y_{nk}$ is a prediction (inference) result.

$$E_i = -\frac{1}{N}\sum_n \sum_k t_{nk} \log y_{nk} \qquad (2)$$

The determination unit 24 is a processing unit that determines whether to request relearning the learning model. Specifically, the determination unit 24 determines whether relearning is required in accordance with the cumulative value of prediction errors calculated by the update unit 23. For example, the determination unit 24 calculates, by using expression (3), a cumulative sum (CE) of cross entropy errors of respective time windows calculated by the update unit 23. When the cumulative sum (CE) is equal to or greater than a threshold, the determination unit 24 requests the air conditioning control server 100 to update the learning model and obtains a new learning model after update.

$$CE = \sum_i E_i \qquad (3)$$

FIG. 9 illustrates a manner of handling prediction errors. As illustrated in FIG. 9, the prediction and the actual user operation are identical to each other at times t1, t3, and t5, and thus, the prediction errors of these time points are all zero. As a result, online learning for the learning model is not performed and the cumulative sum is not increased. By contrast, the prediction at the time t2 indicates "Up (increasing temperature)" while the actual operation is "no operation", and thus, an operation for canceling the prediction is performed. Similarly, the prediction at the time t4 indicates "Down (decreasing temperature)" while the actual operation is "no operation", and thus, an operation for canceling the prediction is performed. At the times t2 and t4, the prediction error occurs because the prediction and the actual user operation are different from each other, and therefore, online learning for the learning model is performed and the cumulative sum is increased.

[Processing Flow]

Next, a processing flow of the system illustrated in FIG. 1 is described. Here, processing of the air conditioning control server 100 and processing of the edge terminal 10 are described.

(Processing of Air Conditioning Control Server 100)

Figure 10:
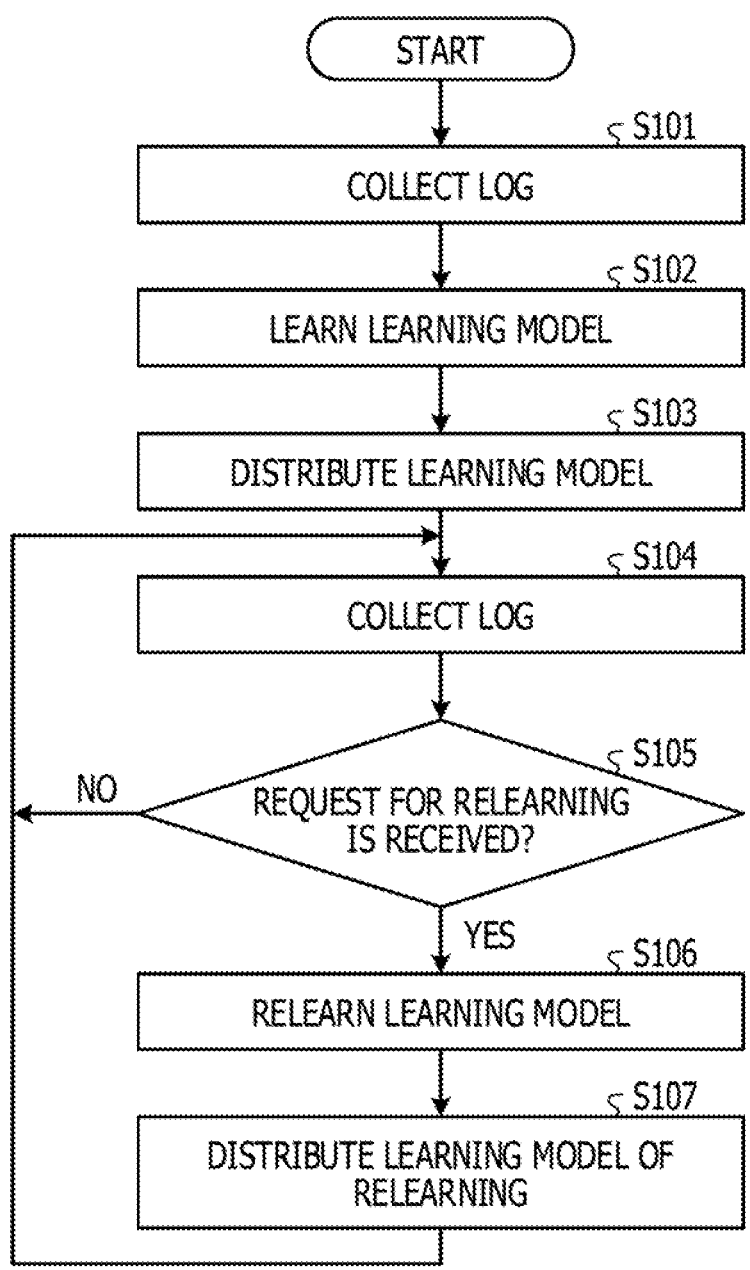
FIG. 10 is a flowchart illustrating a processing flow of the air conditioning control server.

FIG. 10 is a flowchart illustrating a processing flow of the air conditioning control server 100. As illustrated in FIG. 10, the log collection unit 111 collects logs from edges and stores the logs in the sensor value DB 103 or the operation log DB 104 (S101).

The learning unit 112 then learns a learning model by using learning data generated from the logs by the log collection unit 111 (S102). The distribution unit 113 distributes the learning model having been subjected to learning to the edge terminals 10 in different rooms (S103). Afterward, the log collection unit 111 continues to collect logs (S104).

When the relearning unit 114 receives a request for relearning from any of the edge terminals 10 (Yes in S105), the relearning unit 114 relearns the learning model by using learning data containing logs obtained after the completion of the previous learning (S106).

The relearning unit 114 then distributes the learning model after relearning to the edge terminals 10 (S107). This processing continues until an administrator or the like performs an end operation.

(Processing of Edge Terminal 10)

Figure 11:
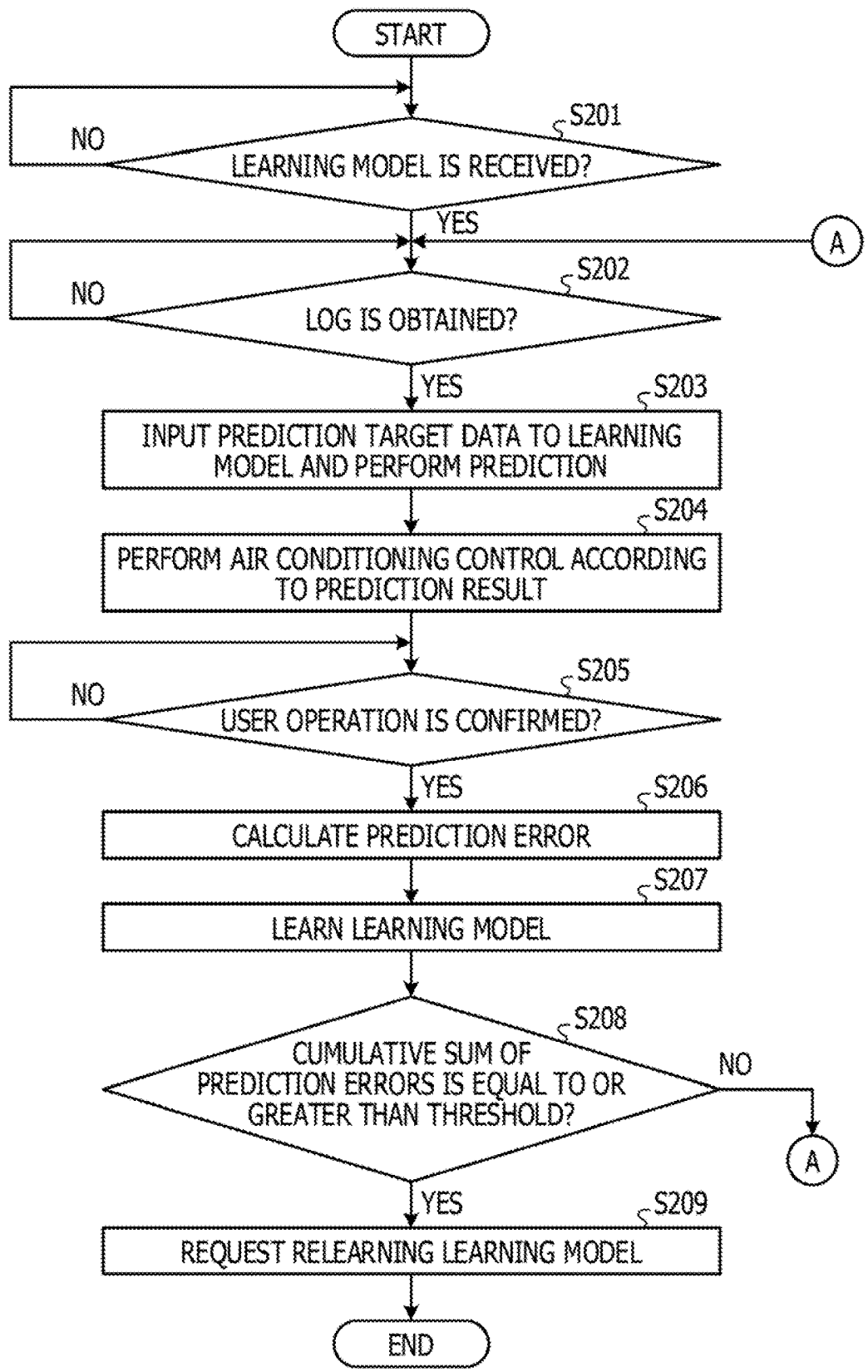
FIG. 11 is a flowchart illustrating a processing flow of the edge terminal.

FIG. 11 is a flowchart illustrating a processing flow of the edge terminal 10. As illustrated in FIG. 11, when the edge terminal 10 receives the learning model (Yes in S201), the log collection unit 21 collects logs from sensors and the like in the room and stores the logs in the sensor value DB 13 and the operation log DB 14 (S202).

The prediction unit 22 inputs prediction target data generated from the logs to the learning model and performs prediction (S203). Afterward, the prediction unit 22 performs air conditioning control in accordance with the prediction result (S204).

When the predicted user operation is confirmed (Yes in S205), the update unit 23 calculates a prediction error between the prediction result and the actual user operation (S206) and updates the learning model by using the prediction error (S207).

The determination unit 24 subsequently calculates the cumulative sum of prediction errors (S208); when the cumulative sum is equal to or greater than the threshold (Yes in S208), the determination unit 24 sends a request for relearning of the learning model to the air conditioning control server 100 (S209). Conversely, when the cumulative sum of prediction errors is less than the threshold (No in S208), S202 and the following steps are repeated.

[Effects]

As described above, the edge performs prediction and air conditioning control by using a learning model developed by the air conditioning control server 100 in the cloud, and additionally, the edge uses the learning model while adjusting the learning model in a fine manner by performing online learning in accordance with data successively observed. When the prediction errors have increased to a limit, the air conditioning control server 100 in the cloud performs relearning. As a result, the edge is able to immediately respond to weather changes and the cloud is able to respond to severe weather changes such as sudden cold waves, and thus, it is possible to develop a learning system with high responsiveness by using an edge terminal with low processing performance and it is possible to hinder the deterioration of prediction accuracy.

Second Embodiment

While the embodiments of the present disclosure have been described, the present disclosure may be implemented in various different forms other than the embodiments described above.

[Target Space]

In the embodiments described above, the example of targeting a room at a company or the like is explained, but this is not construed in a limiting sense. For example, various spaces, such as a cabin of a train, a cabin of a vehicle, a machine room, and a cabin of an airplane, may be targeted.

[Learning Data]

In the embodiments described above, the example of using room temperature, outside-air temperature, and humidity as learning data is explained, but this is not construed in a limiting sense. For example, it is possible to learn a learning model for predicting a user operation by using room temperature and outside-air temperature as learning data or a learning model for predicting a user operation by using, as learning data, changes in room temperature and changes in outside-air temperature during a predetermined period, such as five minutes.

[Numerical Value]

Items and numerical values of the sensor values described in the embodiments are not limited to the ones in the drawings and it is possible to use information that a general wearable terminal, a general sensor, and the like are able to collect. The prediction interval may be changed to any particular time interval, such as thirty minutes later or two hours later. In this case, the collection unit for sensor values and the like are also changed to the particular time interval. While the example of using sensor values and operation logs as learning data is described, this is not construed in a limiting sense and only sensor values may be used.

[Prediction]

While in the embodiments described above the example of developing a learning model for predicting a user operation is explained, this is not construed in a limiting sense and it is possible to develop a learning model for predicting a room temperature. In this case, for example, a room temperature after thirty minutes is used as a target variable. While in the embodiments described above the example of employing a cross entropy error, this is not construed in a limiting sense and a squared error or the like may be employed.

[System]

Processing procedures, control procedures, specific names, and information containing various kinds of data and parameters indicated in the specification and the drawings may be changed in any manner unless otherwise specified.

The constituent elements of the devices illustrated in the drawings are functional conceptual ones and not necessarily configured physically as illustrated in the drawings. Specific forms of distribution and integration of the devices are not limited to those illustrated in the drawings. All or some of the devices may be functionally or physically distributed or integrated in any unit based on various loads, usage statuses, or the like. For example, the edge terminal 10, the prediction unit 22, and the update unit 23 may be integrated with each other.

All or some of the processing functions performed by the devices may be implemented by a central processing unit (CPU) and a program analyzed and run by the CPU or may be implemented by a hardware device using wired logic coupling.

[Hardware]

Figure 12:
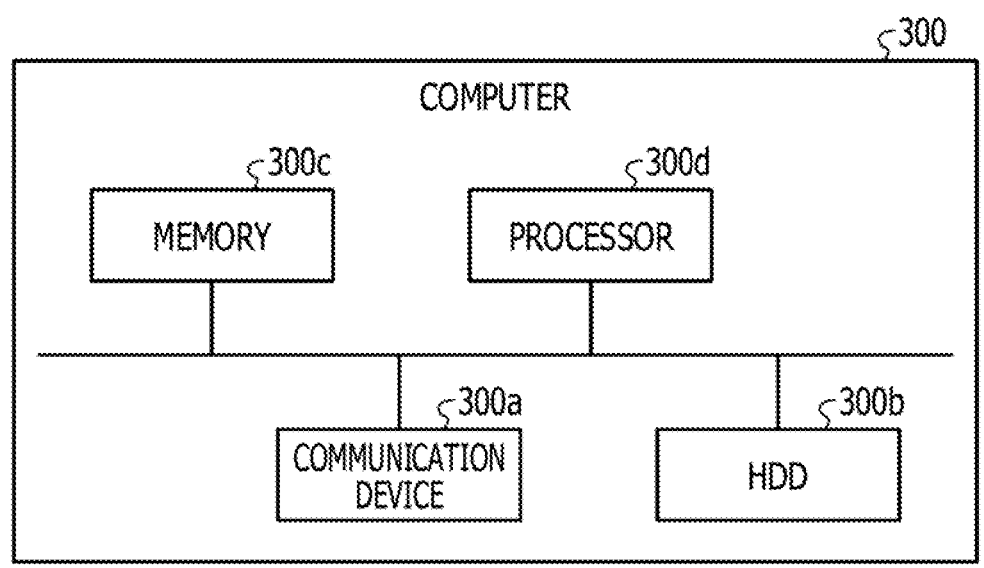
FIG. 12 illustrates an example of a hardware configuration.

Since the air conditioning control server 100 and the edge terminal 10 described above has a similar hardware configuration, the air conditioning control server 100 and the edge terminal 10 both are described here as a computer 300. FIG. 12 illustrates an example of a hardware configuration. As illustrated in FIG. 12, the computer 300 includes a communication device 300a, a hard disk drive (HDD) 300b, a memory 300c, and a processor 300d. The components illustrated in FIG. 12 are couple to each other via a bus or the like.

The communication device 300a is, for example, a network interface card and communicates with a server. The HDD 300b stores a program and DBs that implement functions illustrated in FIG. 3.

The processor 300d executes processes that implement the functions illustrated in, for example, FIG. 3 by reading from the HDD 300b or the like the program that implements processing operations identical to those of the processing units illustrated in FIG. 3 and loading the program into the memory 300c. For example, these processes implement the same functions as those of the processing units included in the edge terminal 10. Specifically, the processor 300d reads from the HDD 300b or the like a program having the same functions as those of the log collection unit 21, the prediction unit 22, the update unit 23, the determination unit 24, and the like. The processor 300d executes processes that implement the same processing operations as those of the log collection unit 21, the prediction unit 22, the update unit 23, the determination unit 24, and the like.

As described above, the edge terminal 10 operates, by reading and running the program, as an information processing apparatus that implements an air conditioning control method. The edge terminal 10 may also implement the same functions as those of the embodiments described above by reading the program from a recording medium with the use of a medium reading device and running the read program. The program according to other embodiments is not limited to a program that is run by the edge terminal 10. For example, the disclosure is applicable to the case in which another computer or a server runs the program or the case in which the other computer and the server cooperate to run the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A prediction method implemented by a computer, comprising:

receiving a classification model from a server, the classification model being a model for classifying logs of an electronic device into two or more classes, the server being a computer configured to distribute the classification model;

calculating, with respect to different time points, a prediction error by using a predicted value outputted by the classification model and an actual measured value observed at each of the different time points;

performing sequential machine learning for the classification model to have the prediction error satisfy a certain condition;

when a cumulative sum with respect to the prediction error of the sequential machine learning is equal to or greater than a threshold, requesting the server apparatus to relearn the classification model;

inputting, to the classification model for predicting details of operation performed by a user to control an air conditioning device, a temperature of a space targeted by the air conditioning device for control and an outside-air temperature both measured at a prediction target time in accordance with a temperature of the space and an outside-air temperature;

obtaining, as the predicted value outputted by the classification model, information indicating the operation performed by the user, the operation being an operation for increasing, decreasing, or maintaining a set temperature of the air conditioning device; and controlling the air conditioning device in accordance with the obtained predicted value.

2. The prediction method according to claim 1, wherein the performing of the sequential machine learning for the classification model includes updating a weight included in the classification model in accordance with an online gradient descent method by using the predicted value and the actual measured value when the prediction error occurs because the predicted value and the actual measured value are different from each other and also includes stopping the sequential machine learning for the classification model when the prediction error does not occur because the predicted value and the actual measured value are identical to each other.

3. The prediction method according to claim 1, wherein
the calculating includes calculating the prediction error in accordance with a cross entropy error calculated by using the predicted value and the actual measured value, and the requesting includes requesting relearning the classification model when a cumulative sum with respect to the cross entropy error is equal to or greater than a threshold.

4. A non-transitory computer-readable storage medium for storing a prediction program which causes a processor to perform processing, the processing comprising:

receiving a classification model from a server, the classification model being a model for classifying logs of an electronic device into two or more classes, the server being a computer configured to distribute the classification model;

calculating, with respect to different time points, a prediction error by using a predicted value outputted by the classification model and an actual measured value observed at each of the different time points;

performing sequential machine learning for the classification model to have the prediction error satisfy a certain condition;

when a cumulative sum with respect to the prediction error of the sequential machine learning is equal to or greater than a threshold, requesting the server apparatus to relearn the classification model;

inputting, to the classification model for predicting details of operation performed by a user to control an air conditioning device, a temperature of a space targeted by the air conditioning device for control and an outside-air temperature both measured at a prediction target time in accordance with a temperature of the space and an outside-air temperature;

obtaining, as the predicted value outputted by the classification model, information indicating the operation performed by the user, the operation being an operation for increasing, decreasing, or maintaining a set temperature of the air conditioning device; and controlling the air conditioning device in accordance with the obtained predicted value.

5. A model learning method implemented by a computer, comprising:

collecting logs of electronic devices installed individually in spaces of different environments;

learn a classification model for performing classification into two or more classes by using learning data generated from the logs of the electronic devices;

distributing the learned classification model to particular devices installed in the spaces;

relearning the classification model in response to a request from any of the particular devices;

redistributing the relearned classification model to the particular devices;

inputting, to the classification model for predicting details of operation performed by a user to control an air conditioning device, a temperature of a space targeted by the air conditioning device for control and an outside-air temperature both measured at a prediction target time in accordance with a temperature of the space and an outside-air temperature;

obtaining, as the predicted value outputted by the classification model, information indicating the operation performed by the user, the operation being an operation for increasing, decreasing, or maintaining a set temperature of the air conditioning device; and controlling the air conditioning device in accordance with the obtained predicted value.

* * * * *